Sept. 6, 1960 E. MACKEY ET AL 2,951,779
PLYWOOD CONTAINERS
Filed Aug. 6, 1957
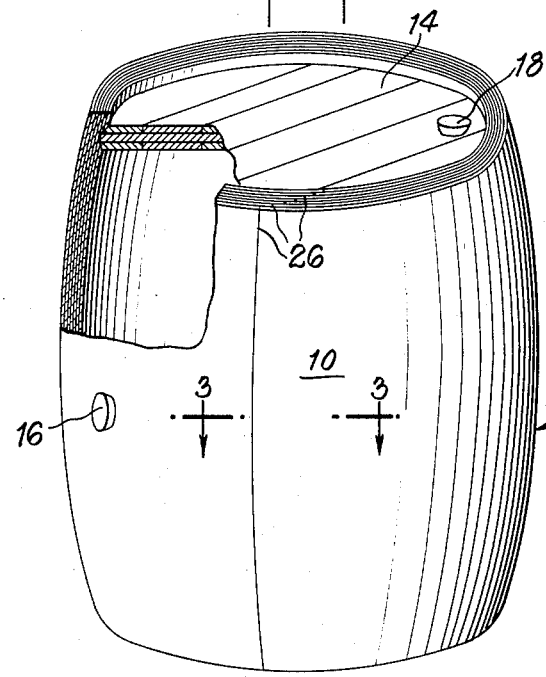
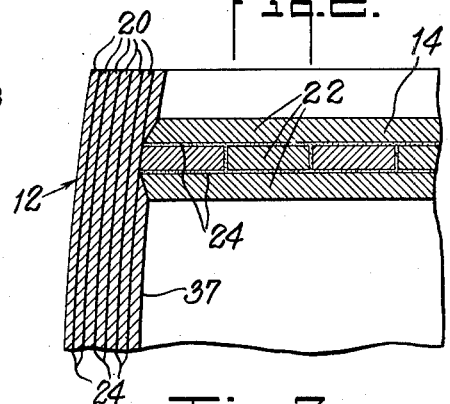
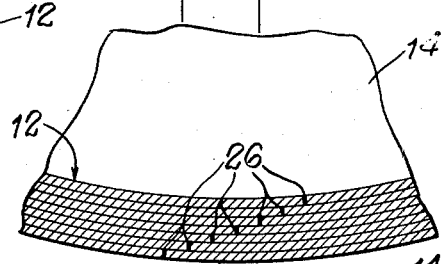
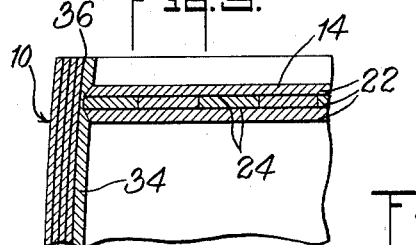
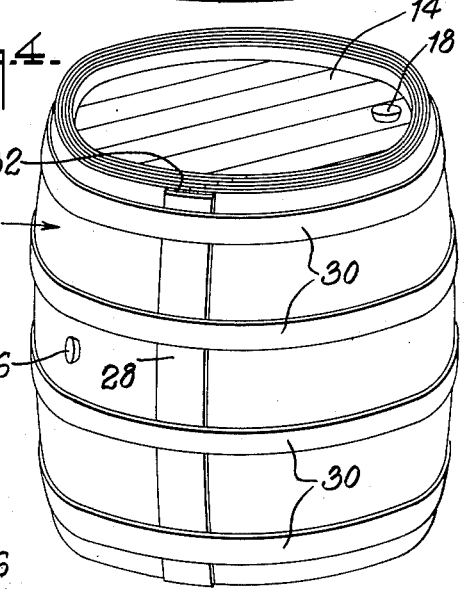
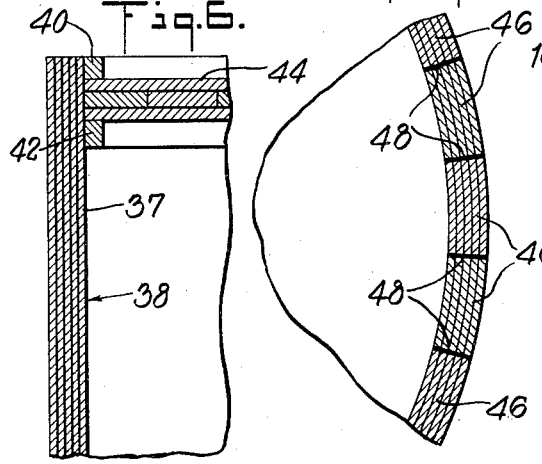
INVENTORS
ERIC MACKEY
HERBERT C. WEINHEIMER
RAYMOND S. LANDON, JR.
BY
*Robert Calvert*
ATTORNEY

000000
2,951,779

PLYWOOD CONTAINERS

Eric Mackey, Trenton, N.J., Herbert C. Weinheimer, Bainbridge, N.Y., and Raymond S. Landon, Jr., Leominster, Mass., assignors to The Borden Company, a corporation of New Jersey Filed Aug. 6, 1957, Ser. No. 676,626

1 Claim. (Cl. 154—45.9)

This invention relates to an adhesive and to plywood articles utilizing the adhesive as a bonding agent between adjacent layers or plies of the wood.

The invention is particularly useful in connection with the making of whiskey barrels and will be first illustrated, therefore, by description in connection with such use.

Plywood whiskey barrels have not been in successful commercial use heretofore in spite of the fact that the white oak required for the present barrels is both expensive and limited in supply.

We can now make plywood barrels satisfactory for the wall construction, that is side, bottom, or top, of such barrels by using a special type of adhesive and maintaining the adhesive at such a distance from the interior surface of the wall construction that no substantial proportion of products of pyrolysis of the adhesive is formed and retained during the charring of the interior to which the barrels are subjected before being filled with the liquor to be aged.

Briefly stated, the invention comprises the adhesive based on epoxylated condensation product of formaldehyde in very low proportion with a phenol, blended and then reacted at the time of use with a polyaminoamide curing agent.

The invention comprises also plywood and plywood containers made with the said adhesive.

Typical reactions involved in making the adhesive are illustrated below. The reactants selected for the illustration are phenol, formaldehyde, epichlorohydrin, and an aminoamide, all in representative proportions.

$$C_6H_5OH + HCHO \xrightarrow{acid} C_6H_4OH.CH_2OH$$

and $$C_6H_4OH.CH_2.C_6H_4OH + \text{excess } C_6H_5OH \qquad (I)$$

The reactants are used here in the proportion of about 0.3 mole of formaldehyde to 1 of the phenol. The result is a novolac condensation product mixed with unreacted phenol.

The mixture so made (written as ROH) is epoxylated, i.e. the several —OH groups are reacted with an epichlorohydrin in contact with the stoichiometric proportion of alkali, as illustrated thus

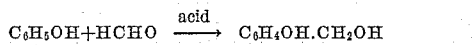

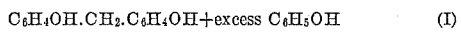

The glycidyl ether mixture so produced is then reacted with an amine terminated amide, as with an excess above 1 equivalent of amine group for 1 glycidyl ether unit. The reaction is represented below in simplified form showing only the type reaction of a single glycidyl ether group with a terminal amine group (NH$_2$ or NHR') of the polyaminoamide.

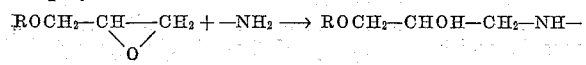

In general, our process includes condensing formaldehyde in very low proportion with a phenol, such as C$_6$H$_5$OH in acid condition, to give the novolac type of water and alcohol soluble condensation product and leave unreacted phenol equal to about 5-15 parts for 100 of the mix with the condensation product. Any free phenol in excess of the 5-15 parts is removed by partial distillation. This special novolac and phenol mixture is then reacted with epichlorohydrin or like epichlorohydrin in contact with an alkali in amount equivalent to the OH groups to be reacted. Sodium hydroxide is the alkali that is ordinarily used. The epoxylated product so made is then separated from by-product salt as by filtering out the salt and water washing the filtrate or by water washing alone.

Epoxidized materials so made are liquid at ordinary temperatures but are cured to firm strongly adherent condition by being mixed with a polyaminoamide and maintained in contact with the amide until reaction is effected.

The epoxylated material is mixed at the time of use with a polyaminoamide curing agent for the epoxylated product.

When used in the plywood industry, the mixture is applied over a surface of a thin layer of wood such as wood veneer and this surface then composited under pressure with another thin layer of the wood. The composite so made is then shaped and the adhesive mixture between the plies is cured as by standing, under the compositing and shaping pressure, for a time such as a day or so at ordinary temperatures or for a shorter time such as 1–8 hours at elevated temperatures below the decomposition temperature of the adhesive, as, for example, 130°–200° F.

The invention, in its use in making containers, will be further illustrated by description in connection with the attached drawings relating particularly to barrel or keg containers and more specifically to such containers with charred interiors for use in aging whiskey.

Fig. 1 is a perspective view, partly broken away, of a barrel constructed with our special adhesive;

Fig. 2 is an enlarged sectional view of an end portion of the barrel of Fig. 1;

Fig. 3 is a sectional view on line 3—3 of Fig. 1 in the direction of the arrows;

Fig. 4 is a perspective view of a modified form of the barrel;

Fig. 5 is a view similar to Fig. 2 of a modified form of barrel;

Fig. 6 is a fragmentary sectional view of another modification of the barrel; and Fig. 7 is a similar view of another form.

There is shown a container, here the barrel 10 with wall including the side 12 and top or bottom 14 provided, respectively, with holes for bungs 16 and 18.

The wall is plywood comprising a series of thin layers of wood (veneers) 20 and 22. These plies of wood are adhered together by means of special adhesive 24.

The edges of the various plies meet at lines out of register as illustrated at 26 so that the resulting longitudinal joint along the side of the barrel is shiplapped. The meeting edges are adhered by our special adhesive as shown at 26.

In the construction shown in Fig. 4, a strip 28 of iron, stainless steel, wood or the like is disposed over the longitudinal shiplap joint. The strip is curved to conform to the side wall of the barrel so as to provide reinforcement of the joint although such reinforcement is ordinarily not necessary. Hoops 30 extend circumferentially around the barrel and assist the glue 32 in holding the strip strongly in position against the joint area.

In the modification of Fig. 5, the inner ply 34 of the side wall of the barrel is made thicker than the other plies, as, for example, at least twice as thick, so as to increase the spacing of the adhesive layer 36 from the interior charred face 37 of the barrel and thus decrease charring to which the adhesive might otherwise be subjected during the charring of the inside face. Suitable thicknesses are 1/4" for the ply 34 and 1/8" for the other 4 plies.

Fig. 6 shows a fragment of a barrel which has a generally cylindrical shape with stops 40 and 42 in the form of rings secured both above and below and in contact with the top or bottom of the barrel to facilitate insertion of the head or bottom 44 in those containers before the outer strip 40 is applied. Strips 40 and 42 are held in position in conventional manner as by adhesive, not shown, adhering the strips to the side wall 38 and to the top or bottom closing member 44.

Fig. 7 shows a modification of the barrel of Fig. 1 in which the side wall of the barrel is formed of a plurality of staves 46. These may be of about the dimensions of usual barrel staves, but they are constructed of plywood with our adhesive. These staves are edge-glued as shown at 48 but may be used in conjunction with the circumferential hoops as shown at 30.

As to materials, the wood may be of any kind that is usual in containers for the purpose for which the plywood article is to be used. For whiskey barrels, for instance, the wood is suitably white oak plied on the inner surface of the container. The white oak may constitute the entire wall thickness if desired but such construction is not necessary. For other purposes, there may be used, for instance, pine, mahogany, maple, or walnut. For whiskey barrels, however, it is considered essential to the proper development of flavor that the inner layer at least of the barrel be oak and that it be charred on its inner face.

As the adhesive for bonding together the several layers of wood, we have found no satisfactory material, after long experimentation, except the epoxylated and then polyaminoamide cured products prepared from materials of the types described.

As examples of the materials to be epoxylated, we use to advantage the product of condensation of about 0.2–0.5 mole of formaldehyde to 1 of phenol by the novolac technique with hydrochloric or like acid catalyst, the condensation being continued and stopped at the A stage containing about 5%–15% of unreacted phenol. If the condensation is stopped before this phenol content results, any excess of phenol is distilled out, to bring the phenol content in the phenol and condensate mix down to that stated. Other phenols may be used in making the novolac type intermediate and providing a remaining phenol. Examples are cresol, resorcinol, and other $C_6$–$C_5$ mono- or polyhydric phenols. We find the $C_6H_5OH$ phenol, however, to be advantageous for our purpose. The epoxylated product made as described herein will contain at least 50% by weight of an epoxylated phenol.

Chlorohydrins that may be used are epichlorohydrin and simple derivatives thereof such as

in which X is any $C_1$–$C_4$ alkyl.

The polyaminoamide used is any amine terminated polyalkylene polyamide. It and its reaction with the glycidyl ether are represented in the following equation.

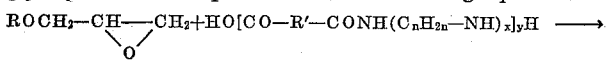

Here R represents the phenolic residue of which $C_6H_5O$, the novolac condensation product less one H, and $CH_3.C_6H_4O$ are examples, $n$ is an integer within the range 1–8 and $y$ 2–15.

$C_nH_{2n}$ represents an alkylene group. Thus an $n$ may be 1–8. Examples of R' that may be used are the polymeric fatty acid hydrocarbon nuclei of oleyl, linoleyl, linolenyl, or stearyl diamide as well as those derived from dibasic acids such as sebacic and adipic acids and the like.

in which $n$ is 2–8 and $n'$ is 2–18 and R'' represents hydrogen or alkyl and suitably 2 hydrogens or 1 hydrogen and 1 $C_1$–$C_4$ alkyl.

The group $H_2N(C_nH_{2n}—NH)_xCO$. represents an aminoamide group derived from a polyamine, as for example, ethylene diamine, diethylene triamine, triethylene tetramine, and the like by reaction in excess with a dicarboxylic acid, the soap first formed being heated to decompose it into the amide. Examples of acids that may be used are dimeric oleic, sebacic, and adipic. Any excess of the polyamine after reaction with the acid is distilled away.

To decrease penetration of the liquid adhesive into the wood to be bonded by the adhesive and particularly to prevent the adhesive from penetrating so close to the surface to be charred, in whiskey barrel treatment, as to be itself in part pyrolytically decomposed, we ordinarily mix with the epoxylated phenolic material a substantial proportion of wood flour, nut shell flour, powders of alumina or silica, or like diffusion retarder before the epoxylated material is reacted with the amide.

To reduce the viscosity of the whole adhesive composition, so as to facilitate the application to the wood, we also incorporate to advantage some solvent that is unobjectionable if small proportions are left in the finished article. In plying wood for whiskey barrels, we use ethanol, for example, such as SDA–35A in which the denaturant is 5% of ethyl acetate. When the plywood article is not to be used for alcoholic liquor and taste is not a factor, then we may use other solvents. Examples are toluene, ethylene glycol monoethyl ether, and methyl ethyl ketone, separately or mixed.

Proportions are expressed here and elsewhere herein as parts by weight unless stated specifically to the contrary.

We use about 0.2–0.5 mole of formaldehyde, in the condensation for 1 mole of the selected phenol. Such low proportion decreases the amount of epichlorohydrin required to about 3–5 moles. If up to 0.8 mole of formaldehyde is used, then the epichlorohydrin required for the proper fluidity of the epoxylated intermediate must be increased as to 7–15 moles.

The 5%–15% of unreacted phenol in the material to be epoxylated provides after epoxylation the desired flow characteristics and, after reaction with the amide, internal plasticization of the final cured adhesive.

The proportion of the polyaminoamide used is that which, for any selected polyaminoamide, is found by preliminary test to convert the epoxylated phenolic material to what might be called solid plastic or firm but somewhat yieldable condition. The proportion for most purposes must be about 1 equivalent weight of the polyaminoamide to 1 of the epoxylated phenolic material calculated on the basis that 1 amine group reacts during the curing treatment with 1 epoxy (glycidyl ether) group. Suitable proportions are 25–200 and usually 75–150 parts of the amino compound for 100 of the epoxylated phenolic material. The final test of the proportion of such curing agent to use is the proportion that, in small scale tests, makes the reaction product with the epoxylated material, after a reasonable curing period such as a day at ambient temperatures, practically insoluble in 93% alcohol.

The wood flour or like material may be omitted in those uses in which penetration of the adhesive throughout the wood being composited is unobjectionable. In the case of the whiskey barrels that are to be charred on the inside, however, incorporation of wood flour is helpful. It decreases the penetration of the adhesive into the interior of the wood that is to form the inside portion of the wall of the container. Suitable proportions of the wood flour or other filler material, are 5–50 parts for 100 of the epoxylated phenolic material, larger proportions being advantageous when the filler used is one of relatively high over-all density, as in the case of powdered silica, and when the layers of wood to be plied are relatively open in structure.

The solvent used to thin the mixture is admixed in proportion to give the consistency desired. With some adhesive compositions of this invention, the solvent may be omitted entirely although we usually introduce about 10–50 parts by weight for 100 of the epoxylated phenolic material. The use of the solvent makes the composition sufficiently spreadable to be applied to wood by usual glue spreading equipment.

The invention will be further illustrated by detailed description in connection with the following specific examples.

*Example 1.—Making adhesive*

24.3 parts of 37% solution of formaldehyde in water (0.3 mole formaldehyde) were mixed with 94 parts of phenol (1 mole) and 3 parts of concentrated aqueous hydrochloric acid as condensation catalyst. The whole was refluxed until the free formaldehyde content of the resulting condensation product, on the water and hydrochloric acid free basis, was less than 1%.

The product was then distilled to remove the water and excess phenol until the free phenol content of the water free product was 5%.

The resulting mixture of water soluble novolac and unreacted phenol was next mixed with 313.8 parts of epichlorohydrin (4 moles) and 40 parts of sodium hydroxide (1 mole). The mixed materials were warmed to cause reaction, with formation of the glycidyl ether of the hydroxy compounds present, namely the free phenol and the condensation product of the rest of the phenol with the formaldehyde. When the precipitation of salt, as the by-product, was substantially complete, the salt was filtered from the liquid. The liquid was washed with water until practically salt and alkali free. This intermediate will contain more than 5% of epoxylated phenol on the weight of the epoxylated novolac condensation product.

The excess of epichlorohydrin in unreacted condition was then distilled out.

The epoxylated material was then mixed with 40% of its weight of alcohol (SDA–35A), 50% of wood flour, and 120% of polyaminoamide curing agent, here the condensation product of dimerized oleic acid with ethylene diamine.

The whole is a thermosetting adhesive ready for application at once to surfaces to be adhered and for curing for a day or so at room temperatures or for several hours at a temperature of about 130°–180° F. When cured as the adhesive in plywood, the adhesive joint is stronger than the adjacent wood, as shown by breaking tests. The adhesive film, on the other hand, is moderately yieldable without rupture. Between plies of wood, as in the whiskey barrel described, it is practically non-extractable by alcohol.

*Example 2.—Adhesive*

The procedure of Example 1 is followed except that the phenol, epichlorohydrin, and polyaminoamide there used is replaced, in turn, with an equivalent weight, respectively, of any phenol, chlorohydrin, or polyaminoamide disclosed specifically or generally herein.

*Example 3.—Whiskey barrel heads*

The adhesive applied was the freshly prepared final product of Examples 1 or 2 before curing. Oak strips ⅜″ thick and 2″–4″ wide were first dried to a moisture content of about 13% and planed so that the side edges would be parallel and also to ⁵⁄₁₆″ thickness. The panels were edge glued with the said adhesive on a conventional grooved rubber roller. The panels were then placed on frames and pressure applied to force the glued edges together for a period of about 24 hours, the pressure being adjusted from time to time to correct dimensional change in the wood due to loss of moisture. After 24 hours, the panels were planed and aged for a 7-day period to promote maximum strength.

The next step was to ply the final head by assembling, face to face, 3 of the edge glued panels, the panels being first face coated with the said adhesive. The panels with the adhesive between them are forced together at 150 p.s.i. for 24 hours and then aged for a 7-day period, to assure that the bond is fully cured before the panels are put to use.

The panels were then edge-trimmed to size and shape desired.

Our tests show that, for non-extractability of the adhesive with alcohol, the curing reaction of the polyaminoamide with the epoxylated phenolic intermediate should be made substantially complete.

*Example 4.—Whiskey barrels*

The heads and bottoms are formed as described in Example 3.

So also is the side wall. In this case, however, the individual plies (wood veneers) must be so thin they may be shaped, after any usual flexibilizing treatment and after being assembled with the adhesive described herein in uncured condition, inside a female mold. The assembly is then expanded against the mold by internal pressure until the ends of the several plies snap into the shiplap joint illustrated. The adhesive is then cured as described.

Because of the special adhesive used and the non-migration of it objectionably within the wood, the charring of the inner surface of the barrel (side and ends) for whiskey aging may be effected after the adhesive is in position.

The grooves or the ring strips, to hold the head and bottom, are introduced in any usual manner and the ends then forced in when desired. They will expand and tighten in use against an aqueous liquid. Other parts, if they are to be used, are applied in conventional manner.

It is to be understood that it is intended to cover all changes and modifications of the examples of the invention herein chosen for the purpose of illustration which do not constitute departures from the spirit and scope of the invention.

We claim:

A plywood container for aqueous alcoholic liquor having an adhesive disposed between and adhering together adjacent ones of the several plies to form the wall of the container, the adhesive comprising the reaction product to alcohol-insoluble form of (1) the epoxylated acid catalyzed novolac condensation product of about 0.2–0.5 mole of formaldehyde with 1 mole of a phenol having in the epoxylated product less than 1% of free formaldehyde and at least about 5% by weight of epoxylated phenol and (2) a polyamide curing agent for the epoxylated product in the proportion of about 25–200 parts by weight of the polyamide for 100 of the epoxylated condensation product and a powdered filler serving as diffusion retarder distributed throughout the adhesive and decreasing the depth of penetration of the adhesive into the said wall, one face of the wall being charred and the adhesive being disposed, at all positions thereof, at a distance from the charred face greater than the depth of penetration of the charring into the wall.

References Cited in the file of this patent

UNITED STATES PATENTS

| | | |
|---|---|---|
| 1,758,336 | Schmid | May 13, 1930 |
| 2,521,912 | Greenlee | Sept. 12, 1950 |
| 2,528,417 | Bradley | Oct. 31, 1950 |
| 2,707,708 | Wittcoff | May 3, 1955 |
| 2,839,480 | Ott et al. | June 17, 1958 |

FOREIGN PATENTS

| | | |
|---|---|---|
| 630,663 | Great Britain | Oct. 18, 1949 |
| 768,125 | Great Britain | Feb. 13, 1957 |